Figure 1:
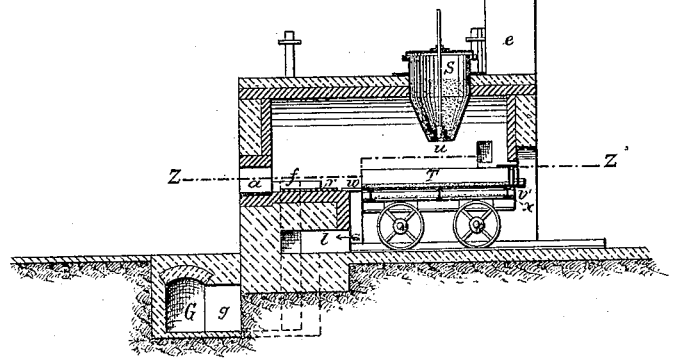

(No Model.)

F. SIEMENS.
MANUFACTURE OF ANNEALED, HARDENED, AND TOUGHENED GLASS ARTICLES.

No. 248,674. Patented Oct. 25, 1881.

UNITED STATES PATENT OFFICE.

FREDERICK SIEMENS, OF DRESDEN, GERMANY.

MANUFACTURE OF ANNEALED, HARDENED, AND TOUGHENED GLASS ARTICLES.

SPECIFICATION forming part of Letters Patent No. 248,674, dated October 25, 1881.

Application filed June 22, 1881. (No model.) Patented in England in December 15, 1879.

*To all whom it may concern:*

Be it known that I, FREDERICK SIEMENS, a citizen of Saxony, residing at Dresden, in the German Empire, have invented a new and useful Improvement in the Manufactuure of Annealed, Hardened, and Toughened Glass Articles, and in the means employed therefor. (for which I have obtained a patent in Great Britain, No. 5,135, bearing date December 15, 1879,) of which the following is a specification.

This invention has more particularly for its object to enable glass articles of irregular shape to be annealed, hardened, and toughened in the course of manufacture by special applications of processes and apparatus, such as were described in the specifications to Letters Patent No. 192,537, Reissues Nos. 8,399 and 8,400, and Letters Patent No. 226,934.

In carrying out such processes for cooling, hardening, and toughening glass articles it has been found that much more perfect results can be obtained by applying them to a glass plate or slab of uniform thickness than to glass articles of any other form by effecting the uniform cooling of such a plate after it has been uniformly heated only from the two larger parallel surfaces thereof. If the heating or cooling be applied also to the edges or circumferential surfaces, these and the parts nearest them will be sooner heated or cooled than the central parts, as the former present more surface to the heating or cooling influence than the latter. From this it is obvious that the simple immersion of a glass body in a cooling element of whatever nature necessarily effects an unequal cooling of the body, because the various parts thereof offer surfaces of varying proportions to the cooling element. Hence it will be seen that a uniform cooling of glass bodies can only be effected when they assume the form of a plate of uniform thickness, and the uniform cooling is effected only from the two larger parallel sides, and in a degree corresponding to the power of conduction of glass—that is, not exceeding such power. Such a plate may be constructed of several parts fitted together, such parts having any desired form, but so that they fit together, in order that the continuous conduction of heat is at no point interrupted. A plate thus produced would also comply with the above-stated conditions, and consequently render a uniform cooling possible. In practice it is, however, not possible to fit glass bodies—in particular those of irregular shape—so perfectly together that no hollow spaces intervene between them, and yet it is necessary to approach the above-described "ideal plate" as nearly as possible. I effect this by filling in such hollow spaces with a material which, at least approximately, has the same properties as glass with respect to the conduction of heat. I therefore thus produce artificially a plate, and, assuming uniform heating to have been effected, I effect the cooling exclusively on the two parallel sides. If the cooling is effected too rapidly, so that its intensity exceeds the heat-conducting power of the glass body, excessive hardening will take place—that is, a state of tension will be produced, resulting in spontaneous ruptures. Such state of tension and consequent rupture is, however, more generally caused by unequal cooling, such as has been above referred to.

The rapidity with which the cooling of a glass body may be effected in order to attain the greatest possible durability depends essentially upon its volume or mass and upon its form. Of the latter I am rendered almost independent by means of my peculiar mode of cooling, and I have therefore practically only to consider the volume or mass. Here the same precautions have to be taken as with my method of hardening—that is, thick glass bodies must be cooled more slowly than thinner ones. In my method of press-hardening I complied with this requirement by introducing between the glass and the cooling pressing-surface partially isolating layers. In my present process I employ other means to the same end, as will be presently shown. Theoretically means would be thus afforded for effecting in irregular-shaped glass bodies a uniform heating or cooling in all parts. A uniformly-heated glass body renders possible a more rapid uniform cooling. By this a hardening is always effected, which results in increased durability.

The body which I have found most suitable for carrying out the above-described process is sand, by preference, with an admixture of burnt and pulverized clay; but I do not limit myself to this material.

I will now proceed to describe the method and means I have employed in applying such process to the manufacture of glass articles, such as plates, railway-sleepers, millstones, and the like, premising that all articles operated upon should be in the first instance formed by casting in molds, and not by the blowing operation.

The consecutive manipulations that are employed are as follows: first, preparation of the molds for the glass body to be manufactured; second, the introduction of the glass into such molds; third, uniform heating and production of the ideal plate; fourth, cooling the same.

First. The preparation of the molds for the glass body may either take place once for several operations, or a special mold may be made for each glass body to be produced. In the first case I employ iron as the material for the mold. In the latter case I employ molding-sand mixed with clay. The application of iron molds is of course very limited with regard to the configuration of the glass body to be produced, or else very complicated apparatus is required in consequence of the necessary divisions of the mold, which would be very expensive, and would render the manipulation very difficult in every respect. In addition, the iron molds have other disadvantages in their rapid absorption of heat, which only affects the glass body superficially. This can certainly be very much reduced by heating the mold; but even then the absorption of heat from the surface may in some circumstances have such a detrimental effect that the use of iron molds has to be abandoned. This particularly occurs with thick or heavy glass bodies. Another disadvantage results from the fact that in this case the cast-glass articles have to be placed in the heating-oven without a mold. This, of course, assumes the glass body to be to a certain extent rigid, and consequently to have been cooled, in order to enable its transport to the heating-oven to be effected without complicated appliances. It is equally difficult to maintain its correct shape in the heating-oven without special appliances, in particular when the weight is great. The use of iron casting-molds is therefore mostly limited to the manufacture of glass articles of the most simple form in large quantities—such, for instance, as flooring slabs. Under certain circumstances I also use combined molds—that is, partly of iron and partly of sand. This occurs when the articles to be cast are undercut, in which cases sand cores are used for their production in the iron molds, thereby obviating a complicated dividing of the mold. The sand mold has a much more general application, as it is not subject to any limitation relatively to the configuration of the articles to be cast. The preparation is quite analogous to that of the mold for iron-castings—namely, by molding in iron boxes from a pattern of the article to be produced. In preparing the iron mold-boxes for this purpose care must be taken that they correspond as nearly as possible to the form of the article to be manufactured—that is, that the thickness of the sand mold shall be at all points as uniform as possible in order to facilitate as much as possible the subsequent uniform heating. Furthermore the mold-boxes should be as light, and therefore as thin, as possible. After preparing the moist-sand molds they are blackened with graphite and baked in a drying-chamber. The blackening with graphite has for its object partly to prevent the adhesion of the glass to the sand mold and partly to effect a more perfect running in of the glass than would be possible without it. The same means are used as in casting iron. Channels are formed for the ready escape of the gases evolved in casting, so as to prevent air-bubbles being formed. Coal-powder, chopped straw, &c., are mixed with the compound of clay and sand, which substances, in burning away during the drying of the mold, leave porosities through which the gases can escape. The process is therefore similar to that of mass-molding. If holes occur in the glass body to be produced, cores are used, which may also be of sand; but in some cases I prefer iron cores. These are prepared by coating correspondingly-formed pieces of iron with clay-puddle and then dusting them over with molding-sand, and after drying they are painted with graphite. Experience has here shown that the article to be produced cannot possibly be kept entire if the core, whether of sand or iron, remains in the article during the cooling process. This results inevitably in the breaking up of the article. This is caused by the imperfect nature of the core material—that is, in its incapacity of expanding and contracting uniformly with the glass. It is therefore indispensable to remove the cores. This is done after the uniform heating has been effected, and renders necessary a special operation before the cooling, which I shall refer to later on.

Second. The introduction of the glass into the mold is effected either by tapping from a glass-melting tank of suitable construction, by pouring from a pot or ladle, or by taking the glass up with a metal rod, from which it is allowed to run into the mold. In the latter case the casting is effected by from three to five operators, according to the size of the article to be produced. If the casting is effected from a glass-melting tank, this is, of course, done continuously, and the molds then have to be brought to the tapping-hole, whereas with the other two modes of casting the glass is brought to the mold. In the first case a suitable heating arrangement should be provided at the tapping-hole, either by direct fire-heat or otherwise, in order to prevent the accumulation of cooled solidified glass, preventing the flow into the molds. A gas-jet may be conveniently used for this purpose. In casting the following precautions have to be taken: The mold must always be warm, particularly if iron molds are used. With sand molds the preliminary warming has the further object of rendering the graphite absolutely dry, as this is very hygroscopic and always causes bubbles when moist. The casting is therefore effected while the molds are still warm—as they come from the drying-chamber.

Third. Uniform heating or preparation of the ideal plate. Two cases may here occur. If the cast article is of simple form without holes, one and the same oven is employed for the heating and for preparing the ideal plate. If the above-described operation of removing cores after heating has to be performed, the part of the oven in which the cooling of the uniformly-heated plate is effected consists of a special construction separable from the oven. The construction of the heating-oven is of very simple nature. The heating may be effected either by direct fire-heat, or preferably by gaseous fuel. It is to be particularly observed that the bed of the heating-oven should receive sufficient heat by means of flues or otherwise. In the heating-oven is contained the sand which is to be employed in the preparation of the ideal plate, and which is brought to the same temperature as the glass articles. The heating process must be regulated chiefly by experience. If there are many bodies of one and the same simple shape and well-distributed mass, the time required for perfect heating is soon ascertained; but with glass bodies of complicated form and not regularly-distributed mass it is different. In this case the appliances hereinbefore mentioned must be used, in order to compensate as much as possible for the imperfections of the filling material. This is effected by removing certain parts of the mold, and, under certain circumstances, also the mold-box. It is absolutely necessary to remove the cores unless these be made of a yielding or collapsible nature, to be presently described. If they have to be removed, the mold, with the glass casting in it, is brought to the working-door of the oven, and the sand-cores are removed by digging out, while the iron cores are simply drawn out by means of tongs. The subsequent running of the hot sand into the core-holes does not hurt, because it can readily give way during the cooling. If desired, the holes may be covered with pieces of thin heated sheet metal, so as to prevent the entrance of sand.

In many cases it will be desirable and of practical advantage to avoid the necessity for removing the cores, for which purpose these may be of such a construction that they are capable of yielding to the pressure of the glass during its contraction on cooling, and which are termed "collapsible" or "spring" cores. For sand and loam cores this is effected by the insertion of metal plates of a thickness corresponding to the size of the core, and so arranged as to divide the core into two or more separate parts. These plates may either be inserted while the core is being made up, or they may be introduced after the separate parts thereof have been formed and baked. If these plates are withdrawn after the glass article has been cast, but before it is introduced into the before-mentioned heating-oven, sufficient space will be formed in the core to allow this to yield to the requisite extent on the cooling of the glass. The liquid glass will not run through the narrow apertures left by the withdrawal of the plates, because it very rapidly cools against the surface of the core to a sufficient extent to prevent this. If the cores be made of iron, which is used for simple forms—such as cylindrical cores—they are made of sheet metal of suitable strength, bent into the requisite shape, but with the edges overlapping instead of butting against each other. The core thus constitutes a spring, which yields perfectly to the shrinking-pressure of the glass without the hole or recess formed by the core becoming deformed in any way. Such spring-cores of thin metal will of course cool down with the glass, and are only removed when this is quite cold.

The glass articles having been heated to the requisite extent, and the cores, if necessary, removed, as above described, the ideal plate is then formed. The arrangement which I employ for this purpose and for cooling the plate is the truck described in my previous patent, No. 226,934, above referred to, constructed to suit the process of cooling here to be observed—that is, with sides protected by double metal plates with a single top and single bottom. This truck is first heated in an oven or stove of the construction described in the specification to the said patent, and then brought to the heating-oven, the bottom covered with a corresponding layer of heated sand, on which are then bedded the cast and prepared glass bodies, and upon this is placed another layer of the heated sand, after which the cover is closed and the truck placed aside to cool. The cooling is therefore only effected through the single cover and bottom. In bedding the glass articles it is to be particularly observed that no part of the iron mold-box touches the sides of the truck. This would at once cause a defective conduction of heat. There must be sufficient sand at the sides. In most cases I prefer to introduce the truck directly into the heating-oven. In this case a recess is formed in the working-floor of the oven, which is at the same height as the bottom of the truck above the floor of the works, while its base is on the same level with such floor, so as to carry the continuation of the tramway thereon.

Instead of the truck, an iron box or case of similar construction, with closing cover, can be introduced into the heating-oven. In this box the formation of the ideal plate is effected. The box is then closed, and is then removed from the heating-oven by any suitable means for the purpose of cooling. In cooling it is to be particularly observed that this shall take place uniformly from the two parallel surfaces. The box must therefore, for example, not touch the ground with the bottom surface—that is, it must not stand, but should be suspended. The most simple case is that in which the heating, the preparation, and cooling of the ideal plate can all be effected in one and the same oven, as is possible with flooring-slabs. These are cast in iron molds, are then introduced into an oven, which is essentially the same as the truck-cooling oven described in the before-mentioned specification. The plates are then placed on a planed table until they are uniformly heated. The bottom of the truck is then covered with a corresponding layer of sand, on which the heated plates are laid. The truck being filled, heated sand is placed over the contents. The entire plate thus formed is left some time in the oven, and after closing the cover the truck is removed for cooling, which takes place in the desired manner from the top and the bottom. A pair of ovens are always used for this purpose, as described in the above-named specification. The apparent defect that the bottom of the truck is cooled by the current of air passing to the combustion-chamber of the oven, and that thus uniform heating of the ideal plate cannot be effected, is met by making the bottom of the truck also double, and by placing upon the lower or outer bottom a sufficient layer of sand to form an isolating-layer during the heating. On removal of the truck from the oven, the lower bottom, with its layer of sand, is removed, whereby the uniform cooling only from the top and the bottom surfaces is rendered possible.

The accompanying drawings show, by way of example, the before-described mode of carrying out my invention, wherein the heating and formation of the ideal plate are effected in one and the same oven, part of which is formed by the truck in which the cooling is afterward effected, this arrangement being more particularly applicable for the production of flooring-plates, tiles, roof-lights, and generally for articles of small and comparatively-uniform height. For effecting a continuous working a pair of such ovens are required, of which the one is being heated while the other is in operation.

Figure 3:
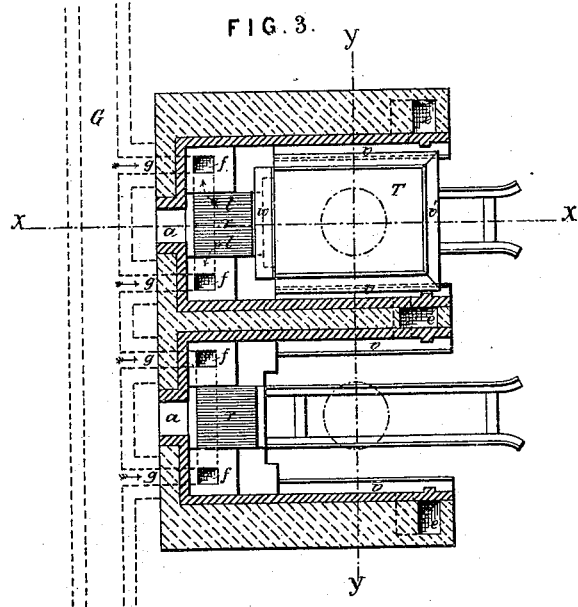
Figure 2:
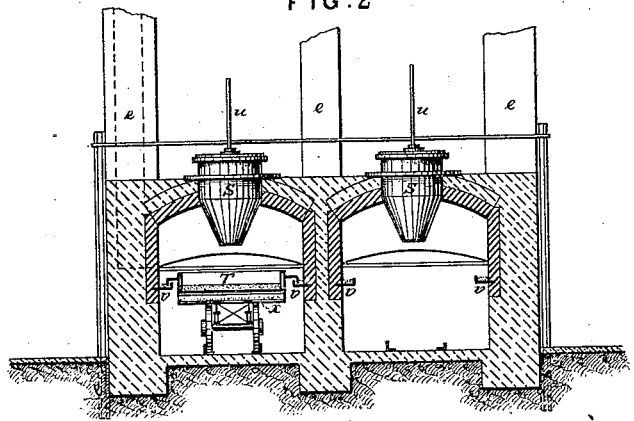

Figure 1 of the drawings shows a vertical longitudinal section of one oven on line X X, Fig. 3. Fig. 2 shows a cross-section of a pair of ovens on line Y Y, Fig. 3; and Fig. 3 shows a sectional plan on line Z Z, Fig. 1.

The ovens are heated by gaseous fuel, the combustible gas being introduced through the main flue G and passages $g$ and issuing through ports $f$ into the oven, the requisite air-supply for combustion being also caused to enter through these ports from passages $l$, into which it flows from beneath the bottom of the truck, as indicated by the arrows. The products of combustion pass off through the chimneys $e$.

$a$ is the working-door, opposite to which is the leveling-table $r$, consisting of a planed cast-iron plate of suitable thickness to prevent warping. Onto this table the glass slabs are placed directly from the casting-molds, and upon it they become uniformly heated to the requisite degree, and at the same time assume the perfectly level shape required.

The truck T, which forms the floor of the oven in a similar manner to that described in the specification to my before-mentioned previous patent, is constructed of sheet-iron, the bottom and front end $w$ being single, and the latter being arranged to turn down, as shown at Fig. 1, while the back and sides are made double, with intervening air-spaces. In the roof of the oven, above the middle of the truck, is fixed the sand-magazine S, from which the sand, heated to the same temperature as the oven, is caused to descend into the truck on opening the valve $u$ by means of an external lever. The sides of the truck are provided with flanges dipping into sand-troughs $v$, for forming an air-tight joint with the sides of the oven, as shown, and the outer end of the truck has a sand-trough, $v'$, into which dips a removable plate for the same purpose. The cover of the truck consists simply of a flanged plate, which is either fitted on after the truck has been removed from the oven, or it may be slid on through the narrow aperture in front after removal of the plate $b$ before the truck is wheeled out. The trucks of both the ovens having in the first instance had a layer of sand placed in them, which is carefully leveled, they are run in the oven, and the hermetic sand joint is formed as described; also, the sand is introduced into the magazine S, and the whole is heated up to the required degree.

The glass articles, having been cast, are introduced as hot as practicable into the one oven onto the table $r$, which is large enough to receive several such articles, in order that they may be there heated to a uniform degree. The articles are then placed on the sand-bed of the truck, and more of the articles are placed on the table $r$ to be heated, which articles are afterward transferred in like manner to the truck. When the truck is filled with glass articles the valve $u$ is opened, and sand is allowed to flow down over the glass articles in such quantity as when leveled down with a rake to form a sufficiently thick layer over them. The cover is then placed on the truck, the front end, $w$, having been first turned up, and the truck is removed and placed aside to cool. A similar truck, with its prepared sand-bed, is then introduced into the oven, and fresh sand is, if necessary, filled into the magazine and the whole is heated up while the before-described operation of heating the glass articles and filling them into the truck is being carried out in the adjoining oven, which has been heated during the filling operation carried on in the other one.

The hinged side $w$ being, for convenience' sake, made single instead of double, as are the other sides, the greater conduction of heat at that side may be counteracted by placing an increased quantity of sand between it and the glass articles nearest to it. Also, as before described, the cooling action of the current of air passing into the oven below the truck may be counteracted by introducing below the bottom of the truck a second bottom, $x$, having a layer of sand, which second bottom is removed when the truck has received its charge.

I do not claim, broadly, the embedding and annealing of glass articles in pulverous material.

Having thus described the nature of my said invention and in what manner the same is to be performed, I claim—

1. The improvement in the art of hardening, toughening, or annealing glass articles, consisting in first heating them uniformly, then embedding them in heated sand or other substance having approximately the same heat-conducting power as glass, which envelope of sand is formed into a body presenting two parallel heat-conducting surfaces, and then subjecting such body to a uniform cooling action applied only to the two parallel heat-conducting surfaces thereof, substantially as herein described.

2. The method of converting irregularly-shaped glass bodies into a body having two parallel heat-conducting surfaces, which are subjected to uniform cooling action by the aid of sand or other substances or compounds having approximately the same heat-conducting powers as glass, substantially as and for the purposes herein described.

3. In the toughening, hardening, or annealing of glass articles, a truck under which the air is free to circulate, on the bottom of which is placed a layer of heated sand or other suitable substance on which the glass articles are bedded, while another layer of heated sand or other suitable substance is placed over the glass articles, substantially as and for the purposes herein described.

4. An annealing-truck with a double bottom, the lower one of which is provided with a non-conducting layer of sand or other material, and is removable for the purpose of cooling after the heating of the glass articles has been effected, substantially as and for the purposes described.

In testimony whereof I have signed my name to this specification, in the presence of two subscribing witnesses, this 2d day of June, A. D. 1881.

FREDERICK SIEMENS.

Witnesses:
LÉON KLEMPERER,
PAUL DURCKMÜLLER.